United States Patent
Guilloux

(10) Patent No.: US 11,199,607 B2
(45) Date of Patent: Dec. 14, 2021

(54) COMBINED METROLOGY METHOD FOR COMPUTING DISTANCE, ROLL AND PITCH ATTITUDES AND RELATIVE ORIENTATIONS BETWEEN TWO UNDERWATER POINTS OF INTEREST

(71) Applicant: SAIPEM S.A., Montigny le Bretonneux (FR)

(72) Inventor: Eric Guilloux, Quimperle (FR)

(73) Assignee: SAIPEM S.A., Montigny le Bretonneux (FR)

( * ) Notice: Subject to any disclaimer, the term of this patent is extended or adjusted under 35 U.S.C. 154(b) by 314 days.

(21) Appl. No.: 16/490,801

(22) PCT Filed: Feb. 22, 2018

(86) PCT No.: PCT/FR2018/050428
§ 371 (c)(1),
(2) Date: Sep. 3, 2019

(87) PCT Pub. No.: WO2018/158526
PCT Pub. Date: Sep. 7, 2018

(65) Prior Publication Data
US 2020/0011964 A1    Jan. 9, 2020

(30) Foreign Application Priority Data
Mar. 3, 2017   (FR) ..................... 17 51744

(51) Int. Cl.
*F16L 1/16*    (2006.01)
*G01S 5/18*    (2006.01)
(Continued)

(52) U.S. Cl.
CPC ............... *G01S 5/186* (2013.01); *F16L 1/16* (2013.01); *G01C 11/00* (2013.01); *G01S 15/86* (2020.01); *G01S 17/87* (2013.01)

(58) Field of Classification Search
None
See application file for complete search history.

(56) References Cited

U.S. PATENT DOCUMENTS

| | | | |
|---|---|---|---|
| 4,031,544 A | 6/1977 | Lapetina | |
| 2016/0124081 A1 | 5/2016 | Charlot et al. | |

FOREIGN PATENT DOCUMENTS

| | | | |
|---|---|---|---|
| FR | 2320862 A1 | 3/1977 | |
| WO | 02063332 A1 | 8/2002 | |
| WO | 2014195610 A1 | 12/2014 | |

OTHER PUBLICATIONS

Rendulic et al., "Estimating Diver Orientation from Video Using Body Markers," MIPRO 2015, May 25-29, 2015, pp. 1054-1059.
(Continued)

*Primary Examiner* — Hovhannes Baghdasaryan
(74) *Attorney, Agent, or Firm* — Workman Nydegger

(57) ABSTRACT

A combined metrology method is provided for calculating the distance, the roll and pitch attitudes, and the relative orientations between two undersea points of interest. The method comprises positioning on the sea bottom a long-range acoustic positioning system having acoustic beacons, calibrating the system in order to determine the positions of the beacons relative to one another, deploying a vehicle on the sea bottom, taking a plurality of scenes around each point of interest in order to acquire point clouds, and processing the point clouds in order to calculate the coordinates of points in a common reference frame defined by the array of beacons and centered on the position of one of the acoustic beacons.

9 Claims, 3 Drawing Sheets

(51) Int. Cl.
G01S 15/86 (2020.01)
G01C 11/00 (2006.01)
G01S 17/87 (2020.01)

(56) References Cited

OTHER PUBLICATIONS

French Search Report from FR Application No. 1751744, dated Dec. 12, 2017.
International Search Report from PCT Application No. PCT/FR2018/050428, dated May 14, 2018.

COMBINED METROLOGY METHOD FOR COMPUTING DISTANCE, ROLL AND PITCH ATTITUDES AND RELATIVE ORIENTATIONS BETWEEN TWO UNDERWATER POINTS OF INTEREST

BACKGROUND OF THE INVENTION

The present invention relates to the general field of undersea metrology. It relates more precisely to a metrology method for the purpose of calculating distance, roll and pitch attitudes, and relative orientations between two undersea points of interest.

A non-limiting field of application is that of calculating the distance, the roll and pitch attitudes, and the relative orientations between the respective flanges of two pipes resting on the water bottom and that are used for transporting hydrocarbons, e.g. oil and gas, coming from undersea production wells.

In the field of undersea hydrocarbon transport, it is known to have recourse to connectors for connecting together two pipes located on the water bottom. Such connectors are underwater structures that are in the form of pipes capable of extending horizontally and resting on the sea bottom (for "spools"), or extending vertically above the sea bottom (for "jumpers").

In order to determine the exact shape and dimensions of such connectors, it is necessary beforehand to know accurately the distance, the roll and pitch attitudes, and the relative orientations between the respective flanges of two pipes or structures resting on the water bottom and that are to be connected together by the connectors. The technique generally used for taking these measurements is that of undersea metrology.

Various types of undersea metrology method exists that are used for calculating the distance, the roll and pitch attitudes, and the relative orientations between the respective flanges of two pipes for connecting together. The metrology method in the most widespread use is that based on an array of acoustic beacons deployed on the sea bottom (known as a "long base line" (LBL) positioning). Such an LBL acoustic system determines the position of an undersea point of interest by acoustically measuring the distance between the point of interest and three (or more) acoustic beacons deployed on the sea bottom. Since the beacons serve to obtain distances, it is necessary for those measurements to have added thereto measurements of attitudes and of orientation taken by means of gyros and inclinometers deployed at predefined points on the undersea structures.

The results obtained by that method based on an LBL array are generally accurate. In contrast, the acoustic beacons used are sensitive to undersea noise and that method takes a long time to implement. Furthermore, that method requires preparation on land in order to determine the offsets between the measured points and the real point of interest (i.e. the centers of the flanges of the pipes for connecting together).

Another known method of undersea metrology makes use of inertial navigation systems with accelerometers and gyros for determining the distances and altitudes of the respective flanges of the two pipes.

The main advantage of that type of method is that it is unaffected by potential poor conditions of undersea visibility, and it is not affected by surrounding undersea noise. In contrast, the inertial navigation systems used by that method present problems of their sensors drifting, and such drifts need subsequently to be corrected by hybridizing with an acoustic positioning system. In addition, attitude measurements can be obtained only by contact with the structures.

OBJECT AND SUMMARY OF THE INVENTION

An object of the present invention is thus to propose a metrology method that does not present the above-mentioned drawbacks.

In accordance with the invention, this object is achieved by a combined metrology method for calculating the distance, the roll and pitch attitudes, and the relative orientations between two undersea points of interest, the method comprising in succession:

positioning on the sea bottom an array of acoustic beacons of a long-range acoustic positioning system, with at least three acoustic beacons being deployed around each point of interest and with two additional acoustic beacons also being deployed;

calibrating the long-range acoustic positioning system in order to determine the relative or absolute positions of the acoustic beacons relative to one another;

deploying on the sea bottom an undersea vehicle provided with point cloud acquisition means;

using the undersea vehicle to take a plurality of scenes around each point of interest in order to acquire a plurality of point clouds, each comprising points representative of a point of interest and also points representative of at least two acoustic beacons deployed around said point of interest;

processing the point clouds in order to calculate the coordinates of the points in a common reference frame defined by the array of acoustic beacons and centered on the position of one of the acoustic beacons; and calculating the distance, the roll and pitch attitudes, and the relative orientations between the two points of interest on the basis of the coordinates for the points of the set of scenes in the reference frame defined by the array of acoustic beacons.

The metrology method of the invention presents numerous advantages over prior art methods. In particular, this method is remarkable in that it combines long-range acquisition means (i.e. the acoustic positioning system constituted by the array of acoustic beacons) with short-range acquisition means (i.e. the acquisition means fitted to the undersea vehicle). Thus, the method makes it possible to reduce the time required for acquiring measurements, it does not require supports to be pre-installed on the points of interest in order to attach measurement apparatuses thereto, and it does not require any contact with the structures while measurements are being taken.

Furthermore, given that the measurement does not relate to a single point as in acoustic beacon methods or as in inertial navigation systems, but instead relates to a point cloud, the resulting measurement redundancy enables much better quality control to be obtained. Finally, the method avoids having recourse to photogrammetric transverses (as are used in prior art photogrammetric and laser methods), thus making it possible to obtain greater measurement accuracy.

The processing of the point clouds advantageously comprises applying a 3D transformation matrix in order to obtain the coordinates of said points in the reference frame defined by the array of acoustic beacons. Under such circumstances, applying the 3D transformation matrix may comprise applying a translation matrix and applying a rotation matrix.

Advantageously, the method further comprises, prior to processing the point clouds, merging the point clouds associated with each point of interest.

Each of the acoustic beacons of the long-range acoustic positioning system advantageously comprises means for emitting and receiving acoustic signals.

The coordinates of the points in the point clouds and the coordinates of points representative of the acoustic beacons associated with each point of interest are advantageously known in an absolute or relative reference frame associated with the acoustic beacons deployed around said point of interest.

The undersea vehicle may include an acoustic scanner, a laser scanner, or a photogrammetric camera for acquiring the point clouds.

The invention also provides the application of the method as defined above for calculating the distance, the roll and pitch attitudes, and the relative orientations between two flanges of undersea pipes for transporting fluids. Under such circumstances, one of the three acoustic beacons deployed for each pipe flange may be positioned on said pipe flange for quality control purposes.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF THE INVENTION

The invention relates to a metrology method for calculating the distance, the roll and pitch attitudes, and the relative orientation between two undersea points of interest.

A non-limiting application example lies with calculating the distance and the relative orientations between the respective flanges (i.e. the respective ends) of two undersea pipes for transporting fluids and resting on the sea bottom, which are to be connected together by means of a "spool" or of a "jumper".

Figure 1:
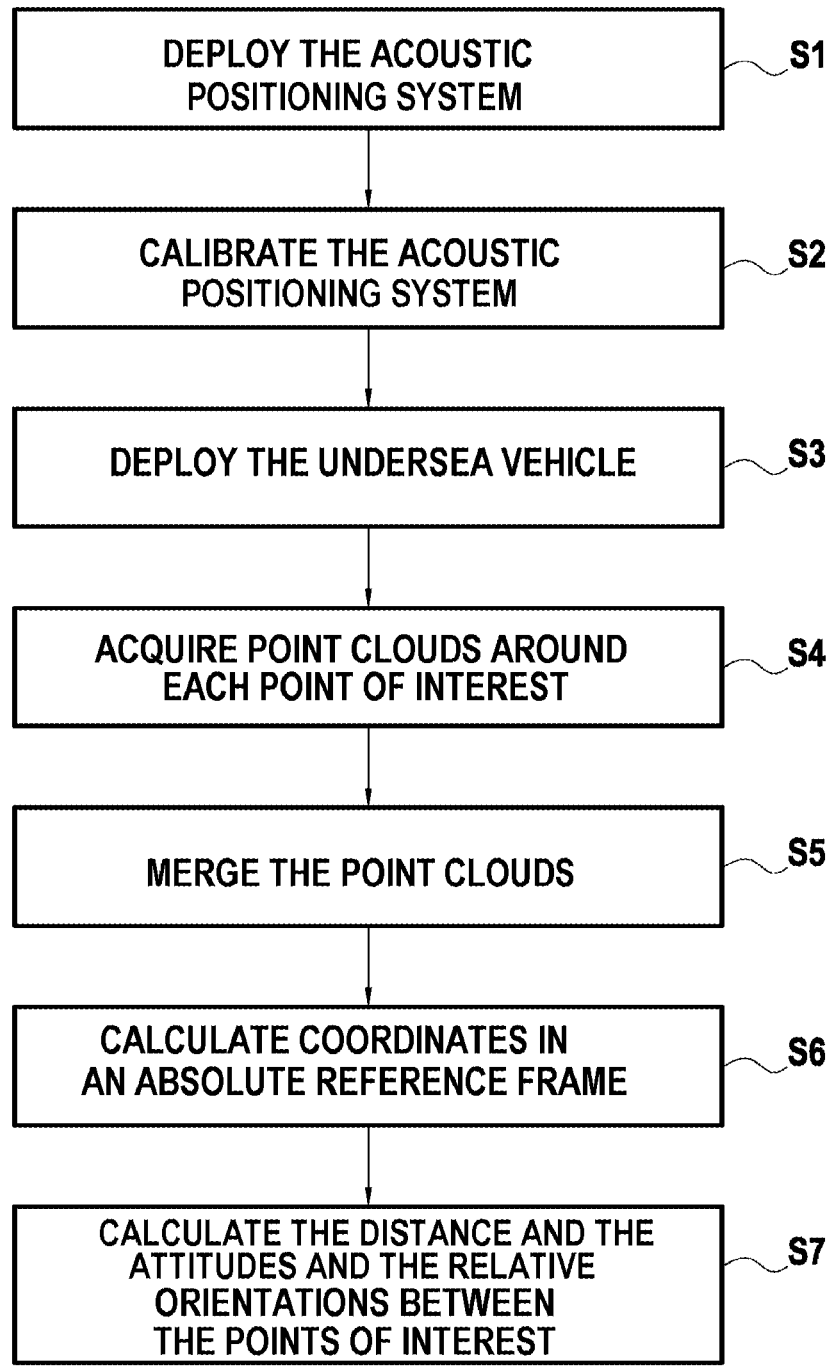
FIG. 1 is a flow chart showing the main steps of the undersea metrology method of the invention.
Figure 2:
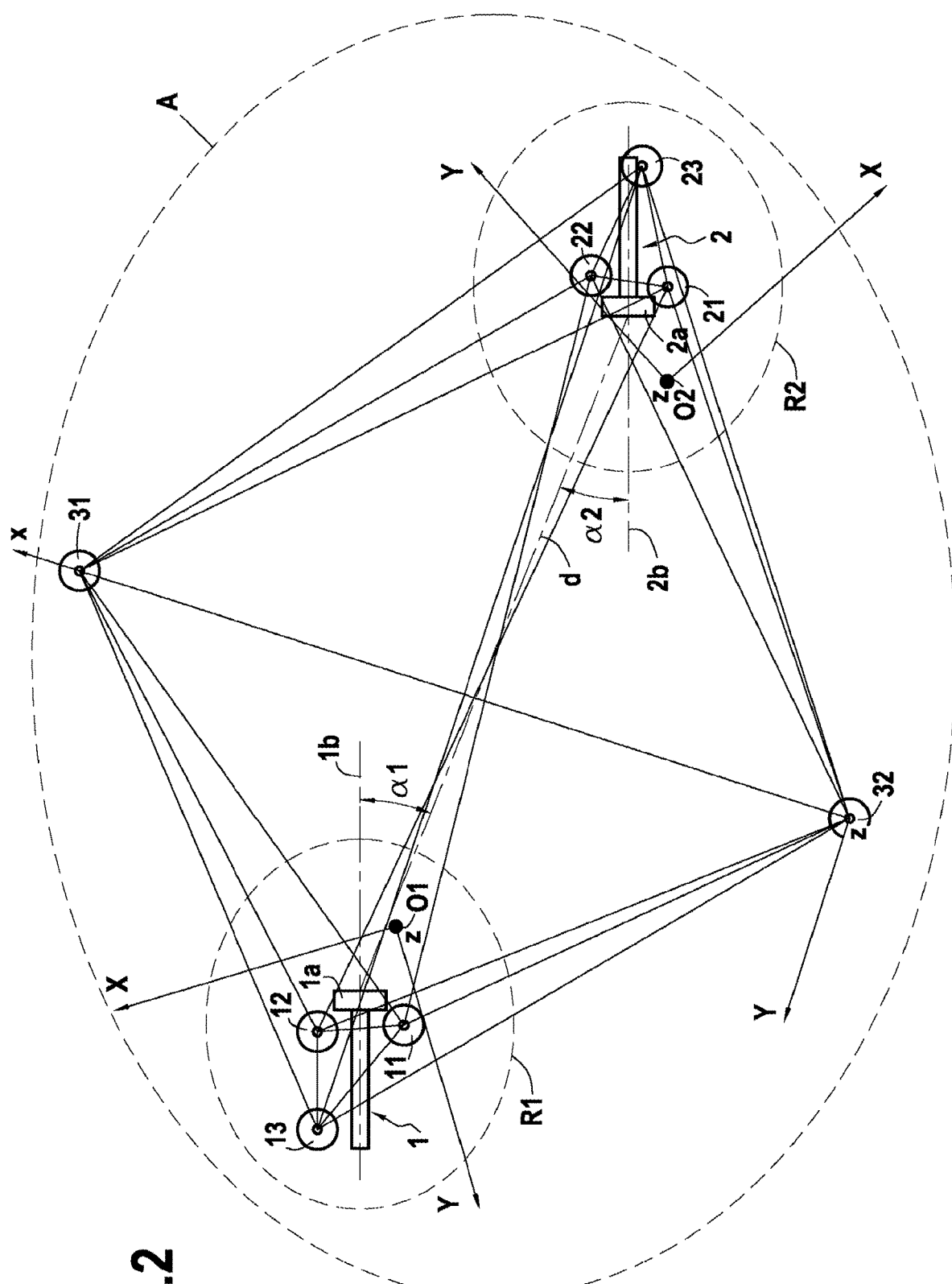
FIG. 2 shows an example application of the undersea metrology method of the invention for calculating the distance, attitudes, and relative orientations between two flanges of undersea pipes for transporting fluids.

With reference to FIGS. 1 and 2, there follows a description of the main steps for performing the metrology method of the invention as applied to calculating the distance d, the pitch attitudes $\beta1$, $\beta2$, and the roll attitudes $\gamma1$, $\gamma2$, and also the relative orientations $\alpha1$, $\alpha2$ between the respective flanges 1a and 2a of two undersea pipes 1 and 2 for transporting fluids.

The term "orientation" is used herein to mean the angles $\alpha1$ and $\alpha2$ formed between the respective longitudinal axes 1b and 2b of the undersea pipes and the straight line d connecting together the respective centers of the flanges of the two undersea pipes (see FIG. 2).

Figure 3:
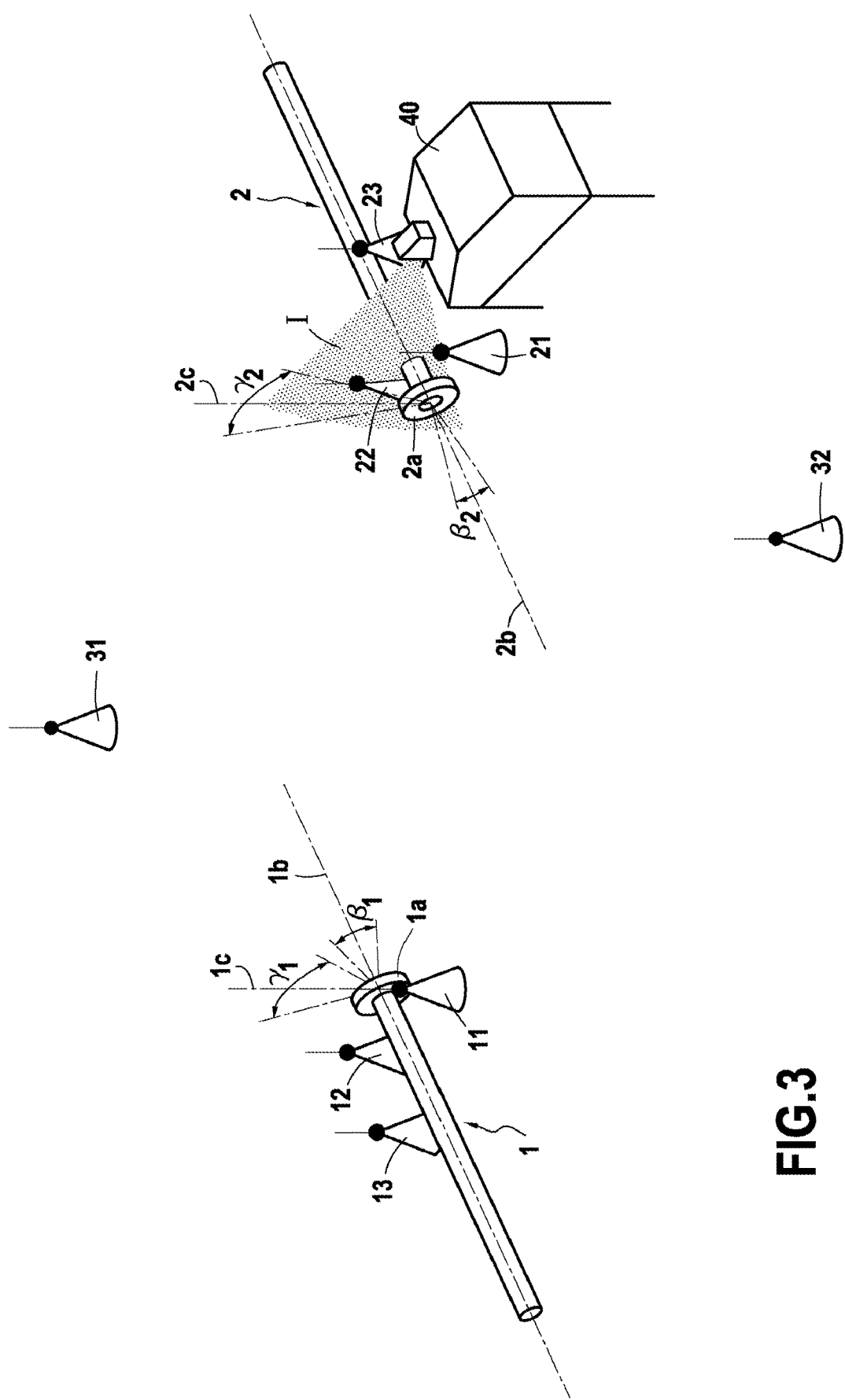
FIG. 3 shows the deployment of an undersea vehicle fitted with a point cloud sensor for performing the method of FIG. 2.

The term "roll attitude" is used herein to mean the angles of rotation $\gamma1$ and $\gamma2$ about the respective longitudinal axes 1b and 2b of the pipes representing the lateral right-to-left movements of the flanges of the pipes. The term "pitch attitude" is used herein to mean the angles of rotation $\beta1$ and $\beta2$ about respective transverse axes 1c and 2c perpendicular to the respective longitudinal axes 1b and 2b of the pipes and representing the front-to-rear movements of the flanges of the pipes. These angles of rotation are shown in FIG. 3.

In a first step S1 of the method, an array of acoustic beacons of a long base line acoustic positioning system is positioned on the sea bottom. That known LBL acoustic positioning system is a geodesic array of limited and temporary range in which each acoustic beacon is positioned by measuring distance relative to the other beacons and having its coordinates known in that geodesic reference frame.

To this end, at least three acoustic beacons 11, 12, and 13 are deployed on the sea bottom around the flange 1a of the pipe 1, and at least three other acoustic beacons 21, 22, and 23 are deployed around the flange 2a of the pipe 2, together with two additional acoustic beacons 31 and 32.

Preferably, in the application example of the invention, one of the three acoustic beacons deployed around each flange is positioned in the immediate proximity of the flange (in the example of FIG. 2, this applies to the acoustic beacons 11 and 21) in order to provide measurement quality control.

In known manner for an LBL acoustic positioning system, each of the acoustic beacons 11, 12, 13, 21, 22, & 23, and 31, & 32 comprises means for emitting and receiving acoustic signals, and the beacons are positioned relative to one another in such a manner that their positioning loci intersect at an angle greater than 30°. Furthermore, some of the beacons are provided with respective pressure sensors for the purpose of defining a common reference plane along the Z axis.

Still in known manner, the LBL acoustic positioning system serves to define a general reference frame in three dimensions that is relative or absolute and that covers the entire zone, and in particular both of the flanges 2a and 2b and all of the acoustic beacons 11, 12, 13, 21, 22, 23, 31 and 32.

The general reference frame is said to be "relative" when it is obtained by measuring distance between two beacons, one of the two beacons constituting the center of the reference frame, and the axis connecting those two beacons together constituting one of the axes.

FIG. 2 shows an example of such a relative general reference frame A (32, X, Y, Z). This reference frame A is defined from the two additional beacons 31 and 32, the beacon 32 defining the center of the reference frame and the axis connecting the beacons 31 and 32 together constituting the X axis.

Alternatively, the reference frame is said to be "absolute" when it is obtained from an absolute coordinate system associated with a terrestrial coordinate system (e.g. the satellite global positioning system (GPS)).

In a second step S2 of the method, the acoustic positioning system as deployed in this way is calibrated.

In known manner, calibration of the array consists in measuring distances between the acoustic beacons, in calculating the position of each beacon in the absolute or relative reference frame as previously defined, and in adjusting the array. The array is adjusted by means of appropriate software performing the least squares method in order to refine the position of each beacon.

Once the acoustic positioning system has been calibrated, the following step S3 of the method consists in deploying an undersea vehicle on the sea bottom, which vehicle is fitted with point cloud acquisition means.

In general manner, such point cloud acquisition means are constituted by any type of apparatus capable of obtaining in real or deferred time a cloud of points, and in particular it may be constituted by laser scanners, acoustic scanners, or by photogrammetric cameras.

In addition, the undersea vehicle may also have means for measuring the speed of sound in water. These means for measuring the speed of sound in water are used for obtaining an accurate speed for the propagation of sound, and thus make it possible to adjust this parameter for the measurement means that are being used, such as the acoustic scanners or the apparatuses for measuring distances between the beacons.

During the following step S4, provision is made to use the undersea vehicle to take a plurality of scenes (or stations) around each flange 1a, 2a of the pipes 1 and 2 so as to acquire a plurality of point clouds around those flanges. FIG. 3 shows an example of a scene I taken around the flange 2a of the pipe 2.

While it is stabilized on the sea bottom, the undersea vehicle acquires these stations around each pipe flange. The various locations of these acquisition stations are defined beforehand and programmed so as to enable each resulting point cloud to contain necessarily some points that are representative of the target flange and some points that are representative of at least two acoustic beacons deployed around the flange. Thus, in the example of FIG. 3, the image I comprises points representative of the flange 2a and of the acoustic beacons 21 and 23.

As a result, the coordinates of points in the point clouds as acquired in this way, and also the coordinates of points representative of the acoustic beacons deployed around the flange are known in the absolute or relative general reference frame A (32, X, Y, Z) as defined by the LBL acoustic positioning system.

Likewise, for each scene, the coordinates of points in the point cloud and the coordinates of points representative of the acoustic beacons deployed around the corresponding flange are known in a particular reference frame centered on the position of the point cloud sensor fitted to the undersea vehicle while taking said scene.

All of the coordinates of the points in the point clouds acquired while taking the various scenes by the undersea vehicle are stored in a memory.

During a step S5, the various point clouds acquired for each pipe flange are imported into point cloud processing software in order to be merged and form a single point cloud associated with each pipe flange.

Once the various point clouds around the zone encompassing each pipe flange have been merged, a set of points is obtained having coordinates that are known in a global relative reference frame R1 (O1, X, Y, Z), or R2 (O2, X, Y, Z) associated with each pipe flange and generally centered on the position of the point cloud sensor fitted to the undersea vehicle when taking the first scene.

For each pipe flange, the following step S6 consists in calculating the coordinates of the points in the set of point clouds merged in this way in the general reference frame A (32, X, Y, Z) centered on the position of one of the two additional acoustic beacons (specifically the acoustic beacon 32 in this example).

This calculation comprises applying a known 3D transformation matrix to the points in the set of point clouds in order to obtain the coordinates of said points in the general reference frame A (32, X, Y, Z).

More precisely, the transformation matrix typically comprises a translation matrix and a rotation matrix. The control points of the rotation matrix are the acoustic beacons that are situated around each flange and that have coordinates that are known both in the general reference frame A (32, X, Y, Z) and in the global reference frame R1 (O1, X, Y, Z) or R2 (O2, X, Y, Z) associated with each flange.

In known manner, starting from the known coordinates of a point in a first reference frame, such a transformation matrix makes it possible to obtain the coordinates of that same point in a second reference frame that is different from the first.

At the end of this calculation step, the coordinates are obtained for the points of the set of point clouds acquired around zones encompassing each pipe flange in the general reference frame A (32, X, Y, Z) centered on the position of one of the two additional acoustic beacons.

Once the coordinates of the set of points are known in the general reference frame A (32, X, Y, Z), the method then makes provision, in a step S7, for using appropriate software to calculate the distance d, the pitch attitudes $\gamma1$ and $\gamma2$ and the roll attitudes $\beta1$ and $\beta2$, and the relative orientations $\alpha1$ and $\alpha2$ between the respective flanges 1a and 2a of two undersea pipes 1 and 2.

The invention claimed is:

1. A combined metrology method for calculating the distance, the roll and pitch attitudes, and the relative orientations between two undersea points of interest, the method comprising in succession:
    positioning on the sea bottom an array of acoustic beacons of a long-range acoustic positioning system, with at least three acoustic beacons being deployed around each point of interest and with two additional acoustic beacons also being deployed;
    calibrating the long-range acoustic positioning system in order to determine the relative or absolute positions of the acoustic beacons relative to one another;
    deploying on the sea bottom an undersea vehicle provided with point cloud acquisition means;
    using the undersea vehicle to take a plurality of scenes around each point of interest in order to acquire a plurality of point clouds, each comprising points representative of a point of interest and also points representative of at least two acoustic beacons deployed around said point of interest;
    processing the point clouds in order to calculate the coordinates of the points in a common reference frame A defined by the array of acoustic beacons and centered on the position of one of the acoustic beacons; and
    calculating the distance, the roll and pitch attitudes, and the relative orientations between the two points of interest on the basis of the coordinates for the points of the set of images in the reference frame defined by the array of acoustic beacons.

2. The method according to claim 1, wherein the processing of the point clouds comprises applying a 3D transformation matrix in order to obtain the coordinates of said points in the reference frame defined by the array of acoustic beacons.

3. The method according to claim 2, wherein applying the 3D transformation matrix comprises applying a translation matrix and applying a rotation matrix.

4. The method according to claim 1, further comprising, prior to processing the point clouds, merging the point clouds associated with each point of interest.

5. The method according to claim 1, wherein each of the acoustic beacons of the long-range acoustic positioning system comprises means for emitting and receiving acoustic signals.

6. The method according to claim 1, wherein the coordinates of the points in the point clouds and the coordinates of points representative of the acoustic beacons associated with each point of interest are known in an absolute or relative reference frame associated with the acoustic beacons deployed around said point of interest.

7. The method according to claim 1, wherein the undersea vehicle includes an acoustic scanner, a laser scanner, or a photogrammetric camera for acquiring the point clouds.

8. The application of the method according to claim 1 for calculating the distance, the roll and pitch attitudes, and the relative orientations between two flanges of undersea pipes for transporting fluids.

9. An application according to claim 8, wherein one of the three acoustic beacons deployed for each pipe flange is positioned on said pipe flange for quality control purposes.

* * * * *